(12) United States Patent  
Zhang et al.

(10) Patent No.: US 9,749,904 B1  
(45) Date of Patent: Aug. 29, 2017

(54) CIRCUIT SWITCH VOICE ROAMING TO LTE NETWORK

(71) Applicant: Syniverse Communications, Inc., Tampa, FL (US)

(72) Inventors: David Xining Zhang, San Jose, CA (US); Huiyue Xu, Beijing (CN); Xiaohua Yuan, Beijing (CN); Zhihai Zhang, Beijing (CN)

(73) Assignee: Syniverse Communications, Inc., Tampa, FL (US)

( * ) Notice: Subject to any disclaimer, the term of this patent is extended or adjusted under 35 U.S.C. 154(b) by 51 days.

(21) Appl. No.: 14/230,633

(22) Filed: Mar. 31, 2014

Related U.S. Application Data

(60) Provisional application No. 61/806,531, filed on Mar. 29, 2013.

(51) Int. Cl.  
*H04W 36/00* (2009.01)  
*H04W 8/04* (2009.01)  
*H04W 4/14* (2009.01)

(52) U.S. Cl.  
CPC ......... *H04W 36/0022* (2013.01); *H04W 4/14* (2013.01); *H04W 8/04* (2013.01)

(58) Field of Classification Search  
CPC ............ H04W 8/00; H04W 8/02; H04W 8/04  
USPC ................................................... 455/432.2  
See application file for complete search history.

(56) References Cited

U.S. PATENT DOCUMENTS

| | | | |
|---|---|---|---|
| 8,682,322 B2* | 3/2014 | Wallis | H04W 36/0022 455/433 |
| 8,706,148 B2* | 4/2014 | Pudney | H04W 4/12 455/466 |
| 9,118,508 B2* | 8/2015 | Bouthemy | H04L 12/66 |
| 2007/0112446 A1 | 5/2007 | Deveaux et al. | |
| 2009/0219902 A1 | 9/2009 | Aoyama | |
| 2010/0311404 A1 | 12/2010 | Shi et al. | |
| 2011/0134838 A1* | 6/2011 | Russell | H04W 48/18 370/328 |
| 2011/0269456 A1 | 11/2011 | Krishnaswamy et al. | |
| 2011/0271331 A1 | 11/2011 | Adams | |
| 2012/0135761 A1* | 5/2012 | Nenner | H04W 4/14 455/466 |
| 2014/0030019 A1* | 1/2014 | Ma | E01C 11/16 404/77 |

* cited by examiner

*Primary Examiner* — Vladimir Magloire  
*Assistant Examiner* — Donald H Braswell  
(74) *Attorney, Agent, or Firm* — Andriy Lytvyn; Smith & Hopen, P.A.

(57) ABSTRACT

An interworking solution only requires that Greenfield LTE deploy the IWF and IMS AS, and set up the connections between their MME and IWF for the IMSI attach procedure. The solution uses an IMS client that can be installed on the roamer's devices. Thus once the roamer is attached to the LTE network together with IMSI attach via IWF function, and registered into the IMS system, the roamer can receive voice call and SMS by the original phone number, even though the LTE operator network does not support CSFB.

9 Claims, 5 Drawing Sheets

CIRCUIT SWITCH VOICE ROAMING TO LTE NETWORK

RELATED APPLICATIONS

This patent application claims priority under 35 U.S.C. §119(e) of the U.S. provisional patent application Ser. No. 61/806,531, filed Mar. 29, 2013, and titled "Circuit Switch Voice Roaming to LTE Network", which is hereby incorporated by reference in its entirety.

FIELD OF THE INVENTION

The present invention relates to voice service under LTE network. More specifically, the present invention relates to roaming services provided by mobile operators to provide their inbound roamers using voice/SMS access to services in their network.

BACKGROUND OF THE INVENTION

Currently most long term evolution (LTE) networks have not deployed commercial IP Multimedia Subsystems (IMS) within their own networks. Thus voice call services are not natively supported in the LTE network, and Circuit Switched fallback (CSFB) is used as the alternative approach. However the CSFB solution requires the LTE operator to connect its core network with the 2G/3G systems either in Gateway System for Mobile Communications (GSM) or Code Division Multiple Access 1×(CDMA1×).

This requirement poses challenges for (1) the Greenfield LTE operators as the visiting operators to support inbound voice roaming service to the roamers requiring CSFB support; (2) LTE plus CDMA1× network as the visiting network to support CSFB from Global System for Mobile Communications (GSM) home operators; and (3) LTE plus GSM network as the visiting network to support CSFB from CDMA home operators.

As used herein, the term "Greenfield LTE operator" refers to the three types of operators mentioned as above. Generally, a Greenfield LTE operator is defined as an operator that has deployed an LTE network but does not have any legacy 2G/3G networks. They may deploy voice/SMS (Short Message Service) components under their IMS systems over the LTE network to offer voice and SMS services to their direct subscribers. However, due to the lack of 2G/3G networks, these Greenfield operators do not support CSFB in their own networks. Thus these Greenfield LTE operators may encounter problems when they try to offer inbound voice roaming services for their LTE roaming partners that don't deploy an IMS system.

Roamers from those home networks request voice support when they roam into such visited networks. If the roamer's device discovers that the network to be attached does not support CSFB during the network attach process, it may re-select other networks that can support CSFB and switch away from the current network. As a result, the Greenfield LTE operator loses the roamer and consequently loses the potential roaming revenue. This can be true even though for some cases the home operator may prefer to use the Greenfield LTE operator due to business and partnership considerations.

SUMMARY OF THE INVENTION

In accordance with the principles of the invention, a voice call service allows roamers to roam into LTE network that do not support CSFB but still receive call services. In one embodiment of the invention, an Internetworking Function (IWF) is introduced as a virtual Mobile Switching Center (MSC) server, interfacing with the Mobile Management Entity (MME) via SGs interface (MME-MSC interface for CSFB), and initiating the International Mobile Subscriber Identity (IMSI) attach procedure towards the roamer's Home Subscriber Server/Home Location Register (HSS/HLR). When a roamer device attaches to the Greenfield LTE operator's network, the device can then be assured that the current visited LTE network supports CSFB during the signaling exchange procedure, allowing the device to successfully attach to the network. After that, the user equipment (UE) establishes a default Evolved Packet System (EPS) bearer connection setup towards the Packet Data Network Gateway ("PDN GW" or "PGW"). If the IMS Application Server (AS) is hosted in a different network that cannot be reached via the default PDN GW, the IMS client on the UE triggers a Dedicated Bearer Establishment procedure to establish a dedicated EPS bearer towards a new PGW that can be used to reach the IMS AS. Then, the IMS Client triggers the registration into the IMS AS. Thus when the home operator Gateway MSC (GMSC) receives the voice call setup request to the roamer, the GMSC queries the Home HSS/HLR for a Mobile Station Roaming Number (MSRN) that can be used to route the call. In turn, the Home HSS/HLR asks the IWF, and the IWF asks the IMS AS for the MSRN. After a successful response with the correct MSRN, the Call Setup signaling can be then set up from the GMSC towards the IMS AS, and can be directed to the IMS Client via Session Initiation Protocol (SIP).

In a first aspect of the invention, a method provides a voice call service allowing a user device to roam into an LTE network without Circuit Switched fallback (CSFB) capabilities. The method includes receiving a request from the user device to access voice call services in the LTE network; converting between an interface for CSFB of a visited network mobility management entity (MME) and a Mobile Application Part (MAP) protocol of a home Home Location Register/Home Subscriber Server (HLR/HSS) to facilitate an International Mobile Subscriber Identity (IMSI) attach procedure using an Interworking Function; upon receiving voice call setup signaling from the home HLR/HSS, interrogating a Voice Switch for a Mobile Station Roaming Number (MSRN); and transmitting the MSRN to the user device for accessing voice call services in the LTE network.

In a second aspect of the invention, a method provides Short Message Service (SMS) for a user device to roam into an LTE network without Circuit Switched fallback (CSFB) capabilities. The method includes receiving a request from the user device to access SMS in the LTE network; converting between an SGs protocol of a visited network mobility management entity (MME) and Mobile Application Part (MAP) protocol of a home Home HLR/HSS to facilitate an IMSI attach procedure using an Interworking Function; receiving an SMS route query signaling from the Home HLR/HSS; responding to the SMS route query signaling with an Interworking Function Global Title address as a visited Mobile Switching Center (MSC) address; receiving an SMS terminating message from a Short Message Service Center (SMSC); converting the SMS terminating message into SIP signaling; and routing the SIP signaling to an IP Multimedia Subsystem (IMS) system for delivery to the end user device for accessing SMS in the LTE network.

In a third aspect of the invention, an Interworking Function system converts between SGs protocol of visited network Mobile Management Entity (MME) and Mobile Application Part (MAP) protocol of a Home HLR/HSS, facilitating an International Mobile Subscriber Identity (IMSI) attach procedure, and enabling voice and SMS services for an end user device to roam into LTE networks without CSFB capabilities. The Interworking Function system comprises a processor and a memory containing computer-executable instructions that when executed by the processor perform a method comprising: upon receiving SGs Update Location Request from an MME located in a visited LTE network without CSFB capabilities, converting the SGs Update Location Request into a MAP Update Location Request and sending the MAP Update Location Request to the Home HLR/HSS based on SS7 routing mechanism; upon receiving the MAP Update Location Response from the Home HLR/HSS, converting the MAP Update Location Response into an SGs Update Location Response and relaying the SGs Update Location Response to the visited MME; upon receiving voice call setup signaling from the Home HLR/HSS, interrogating a Voice Switch for Mobile Station Roaming Number (MSRN) and responding to the Home HLR/HSS;upon receiving SMS route query signaling from the Home HLR/HSS, responding with an Interworking Function Global Title address as the visited Mobile Switching Center (MSC) address; and upon receiving an SMS terminating message from a Short Message Service Center (SMSC), converting the SMS into SIP signaling and routing the SIP signaling to an IP Multimedia Subsystem (IMS) system for delivery to the end user device.

BRIEF DESCRIPTION OF THE DRAWINGS

It will be appreciated that the figures are used to illustrate embodiments of the invention and are not intended to limit the scope of the invention. In the figures, identical reference numerals refer to the same or similar elements.

DETAILED DESCRIPTION OF THE DRAWINGS

The present invention relates to a network communication, and more specifically, internetworking functions for providing voice call and SMS service for roamers when in LTE networks that do not have CSFB capabilities.

In accordance with the principles of the invention, Greenfield LTE operators only need to deploy the IWF and IMS AS and set up connections between their MME and IWF for the IMSI attach procedure. The LTE operator can also offer an IMS client that for installation on roamers' devices. Thus, once a roaming device is attached to the LTE network together with the IMSI attach via the IWF Function and registered into the IMSI system, the roaming device can receive voice calls by the original phone number and the phone number can be kept when placing outgoing calls.

Figure 1:
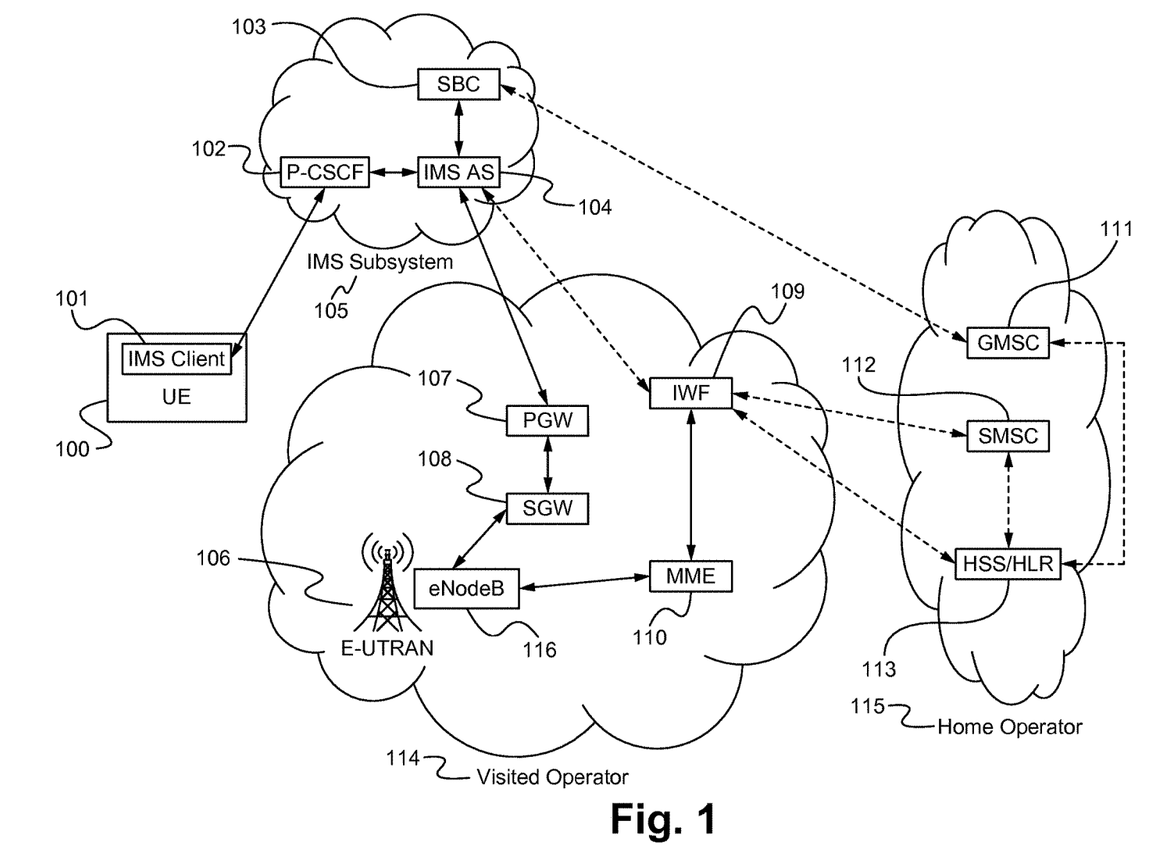
FIG. 1 is the overall system architecture of the Circuit Switch Voice Roaming to LTE network, in accordance with one embodiment of the invention.

FIG. 1 is an overall system architecture diagram illustrating an overall architecture in accordance with one embodiment the invention. The architecture includes an IMS Client 101 running on the User Equipment (UE) 100, providing mobile voice and SMS service for the end user, an IMS Subsystem 105 providing the voice and SMS service by working with the IMS Client 101, Visited Operator 114 as the network provider to provide radio access service for roamer's equipment with LTE accessing capability, and a Home Operator 115 where the user subscribes to the service.

The IMS Client 101, also referred to as SIP Client or SIP User Agent (UA), includes a Graphic User Interface (GUI) that interfaces with the end user to make and receive voice calls and to send and receive SMS and other services. The GUI also interfaces with the IMS AS at the core network for the registration, Voice/SMS calls, NAT traversal, heartbeat and keep alive messages. The UE 100 is a standard user device with a Universal Subscriber Identity Module (USIM) for accessing LTE radio and service capabilities.

The Interworking Function (IWF) 109 (also referred to as an IWF system) serves as a virtual Visitor Location Register/Mobile Switching Center (VLR/MSC) server and has interworking functionality, facilitating the IMSI attach procedure towards the HLR system and supporting the standard voice call and SMS procedure when interfacing with home operator networks.

The IMS Subsystem 105 provides voice and SMS services for the registered users. In the embodiment of FIG. 1, the IMS Subsystem 105 includes a Proxy Call Session Control Function (P-CSCF) 102, Session Border Control (SBC) 103, and an IMS AS 104. The P-CSCF 102 functions as a proxy server for the UE 100, validating and then forwarding requests from the user equipment (e.g., UE 100) and then processing and forwarding the responses to the user equipment. The SBC 103 is the gateway and border system that connects the Circuit Switch domain and the IMS domain for signaling conversion and media codec translation. The SBC 103 interfaces with the IWF 109 for the Roaming Number negotiation during the initial call routing process. The IMS AS 104 includes the functions for SIP registration, call signaling setup, and routing, to name only a few such functions. The IMS AS 104 interfaces with the IMS Client 101 for the user registration and call setup, interfaces with the SBC 103 for call routing when it receives voice call/SMS requests from the Home Operator 115, with the GMSC 111, and with the SMSC 112 or the IMS Client 101.

In example of FIG. 1, the Visited Operator 114 has deployed an LTE network with components, including an Evolved Universal Terrestrial Radio Access Network (E-UTRAN) 106, a E_UTRAN Node B (eNodeB) 116, a PGW 107, a Serving Gateway (SGW) 108, and MME 110, which together provide LTE network service for domestic subscribers and inbound roamers. The E-UTRAN 106, eNodeB 116, PGW 107, SGW 108 and MME 110 are standard network elements defined in 3GPP TS 23.401 V12.4.0 (2014-03) Technical Specification; 3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 12), (hereinafter, "3GPP TS 23.401"), which is hereby incorporated by reference in its entirety.

A typical Home Operator 115 has deployed the GMSC 111, the Short Message Service Center (SMSC) 112, and the HSS/HLR 113 within its network, which provide voice and SMS service for their subscribers. The GMSC 111, SMSC 112, and HSS/HLR 113 are also standard network elements defined in 3GPP TS 23.401.

Network Attachment and Service Registration

Figure 2:
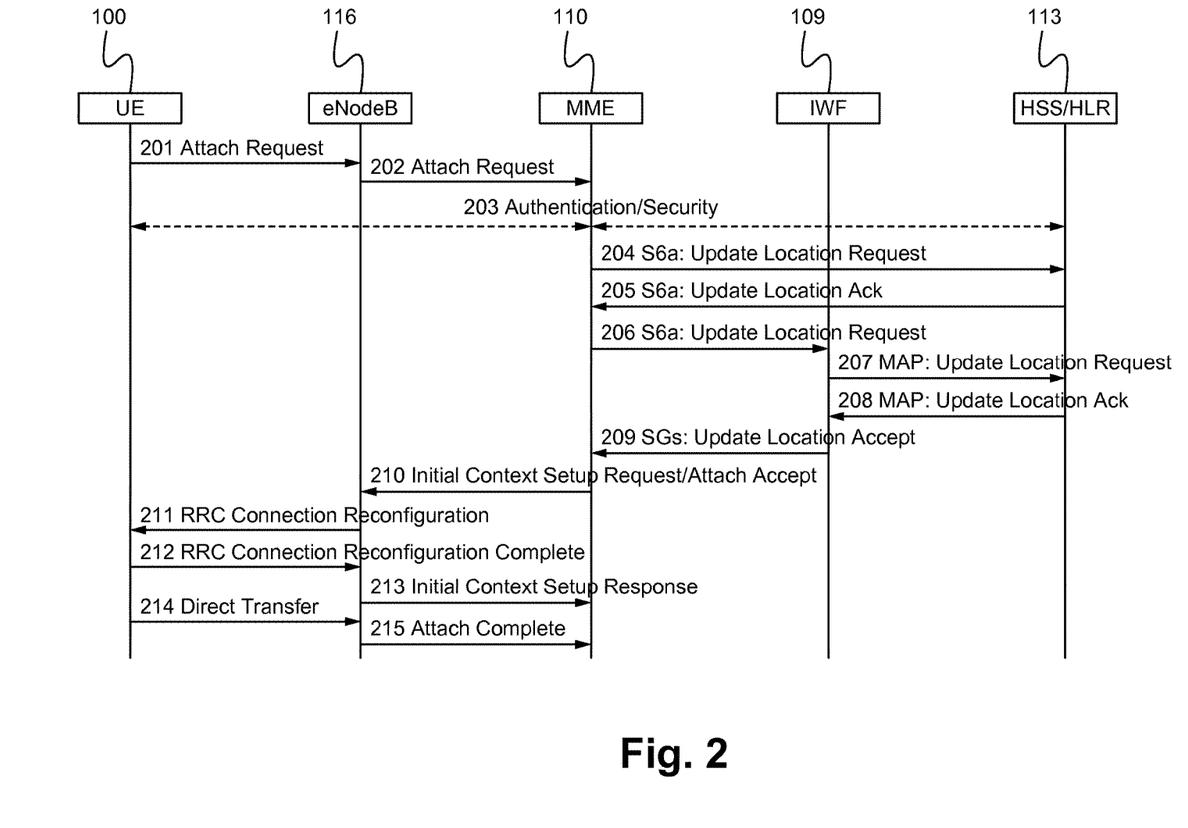
FIG. 2 is a detailed signaling call flow of a Network Attach Procedure, where the IWF is used to facilitate the roaming registration, including initial attach, SIM authentication, update location, and EPS bearer creation, in accordance with one embodiment of the invention.

Referring now to FIGS. 1 and 2, which is an exemplary message flow diagram for the network attach procedure in accordance with one embodiment of the invention, with the IWF involved for the LTE network attach when the UE 100 is roaming in the Visited Operator network 114.

The UE 100 needs to register with the network 114 in order to receive services provided by the network 114. This registration is referred to as "Network Attachment." When the UE 100 is outside the coverage of its Home Operator 115, it searches radio signals and detects the roaming partner's network, which, in this embodiment, is the Visited Operator 114. The UE 100 then initiates Attach Request 201 to the eNodeB 116 with IMSI and other parameters required according to 3GPP TS 23.401.

The Attach Type in Attach Request 201 indicates that the UE 100 requests a combined EPS/IMSI attach and informs the Visited Operator 114 that the UE 100 is configured to use CS fallback and/or SMS over SGs. eNodeB 116 and then derives the serving MME 110 from the parameters indicated by the selected network or selects a new MME based on MME selection function.

The eNodeB 116 then forwards Attach Request 202 message to the MME 110 contained in an S1-MME control message (Initial UE message). If no context for the UE 100 exists in the network, or if the Attach Request 202 message is not integrity protected, or if the check of the integrity fails, then the Authentication/Security checking procedure 203 is initiated.

After the step 203, all Non Access Stratum (NAS) messages are protected by the NAS security functions (integrity and ciphering) indicated by the MME 110 unless the UE 100 is emergency attached and not successfully authenticated.

Next, the MME 110 sends S6a: Update Location Request 204 message to the HSS/HLR 113, including the parameters MME Identity, IMSI, ME Identity, MME Capabilities, Update Location Request (ULR)-Flags, etc.

The Home HSS/HLR 113 acknowledges S6a: Update Location Request 204 by sending S6a: Update Location ACK 205 with Subscription data to the MME 110. The Subscription Data contains one or more PDN subscription contexts. Each PDN subscription context contains an EPS subscribed QoS profile and the subscribed Access Point Name (APN) Aggregate Maximum Bit Rate (APN-AMBR).

Since the UE 100 has indicated its capability to support CSFB and requests Circuit Switch voice and SMS service, after the LTE initial attachment is successful, the MME 110 then triggers the IMSI attach procedure by sending SGs: Update Location Request 206 message to the IWF 109, including parameters such as new Location Area Identification (LAI), IMSI, MME name, Location Update Type, selected Circuit Switched (CS) domain operator, etc.

Upon receiving the Update Location Request 206 from the MME 110, the IWF 109 creates an association with the MME 110 by storing the MME 110 name and then performs the normal subscription checks for the Circuit Switch. If all the checks are successful, the IWF 109 then performs a Location Updating procedure in the Circuit Switch domain.

To perform the Circuit Switch domain Location Update, the IWF 109 converts the SGs protocol into Mobile Application Part/Signaling System No. 7 (MAP/SS7) protocol, and sends out MAP: Update Location Request 207 to the Home HSS/HLR 113.

The Home HSS/HLR 113 checks the subscriber's subscription information and returns MAP: Update Location ACK 208 to the IWF 109. During this location update procedure, the IWF 109 Global Title (GT) address is then stored in the HLR system as the current VLR/MSC address for the subscriber, which can be used during the voice call and SMS setup procedure.

The IWF 109 further converts MAP: Update Location ACK 208 into SGs: Update Location Accept 209, which it transmits to the MME 110, and in turn the MME 110 continues processing to create a GTP session and bearer for the data service.

Following the standard 3GPP protocol (as explained, for example, in 3GPP TS 23.401), the MME 110 sends Initial Context Setup Request/Attach Accept 210 with all necessary parameters to the eNodeB 116. The eNodeB 116 sends the Radio Resource Control (RRC) Connection Reconfiguration 211 including the EPS Radio Bearer Identity to the UE 100, and the Attach Accept message is then sent to the UE 100. The UE 100 sends RRC Connection Reconfiguration Complete 212 to the eNodeB 116. The eNodeB 116 sends Initial Context Setup Response 213 to the MME 110, including the TEID of eNodeB 116 and the address of the eNodeB 116 used for downlink traffic on the S1_U reference point.

Next, the UE 100 sends Direct Transfer 214 to the eNodeB 116, which includes the Attach Complete (EPS Bearer Identity, NAS sequence number, NAS-MAC) message. The eNodeB 116 forwards Attach Complete 215 to the MME 110 in an Uplink NAS Transport message.

After the Attach Complete message, once the UE 100 obtains a PDN Address, the UE 100 can then send uplink packets towards the eNodeB 116, and the uplink packets will then be tunneled to the SGW 108 and the PGW 107. The data bearer is then established and the UE 100 can initiate the IMS registration to the IMS Subsystem 105 for voice and SMS service.

Figure 3:
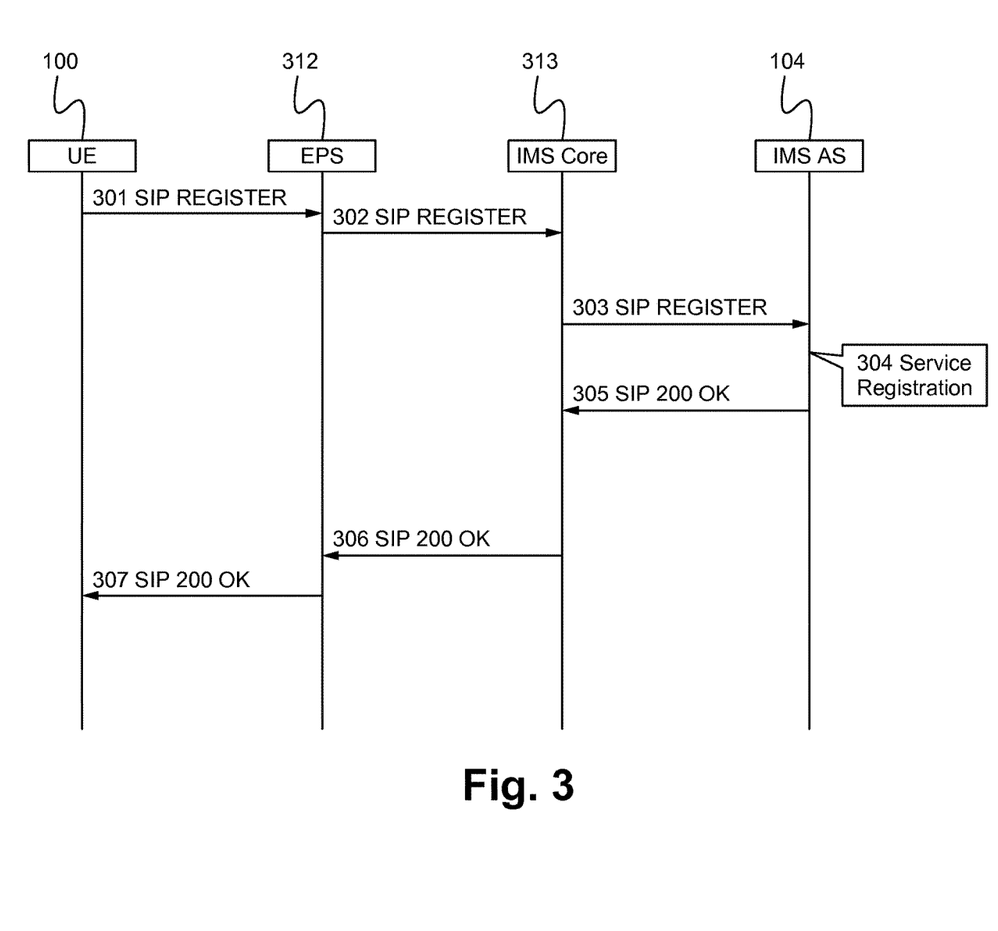
FIG. 3 is a detailed signaling call flow of an IMS registration procedure triggered from IMS client to authorize IMS client for IMS voice and SMS service, in accordance with one embodiment of the invention.

Referring now to FIGS. 1 and 3, which is the exemplary message flow for the SIP Registration to IMS Subsystem 105 in accordance with one embodiment of the invention, the UE 100 sends SIP REGISTER 301 to an EPS 312 (not shown in FIG. 1). The EPS 312 provides a data bearer for SIP signaling traffic. The EPS 312 transmits SIP REGISTER 302 message to the IMS Core 313 (not shown in FIG. 1). In one embodiment, the SIP REGISTER 302 message is the same as the SIP REGISTER 301 message. The UE 100 is able to get the IP address of the IMS Core 313, i.e. P-CSCF, by P-CSCF discovery procedures specified in 3GPP TS 23.228 V12.4.0 (2014-03) Technical Specification; $3^{rd}$ Generation Partnership Project; Technical Specification Group Services and System Aspects; IP Multimedia Subsystem (IMS); Stage 2 (Release 12), which is hereby incorporated by reference in its entirety.

The purpose of the SIP REGISTER 301 is to register the user's SIP Uniform Resource Identifier (URI) in the IMS Subsystem 105. This request is routed to IMS Core 313 because it is the only SIP server known by the UE 100. After checking the user profile, the IMS Core 313 will trigger registration to the IMS AS 104 for voice and SMS service. As part of Service Registration 304 procedure, the IMS AS 104 will create a context for the UE 100.

Once Service Registration 304 is completed in the IMS AS 104, the IMS AS 104 sends a SIP 200 OK 305 back to the UE 100 via the IMS Core 313 and the EPS 312. Now, the user can use the UE 100 to make/receive voice and SMS calls via the IMS Subsystem 105.

Mobile Voice Terminating Call Routing

Figure 4:
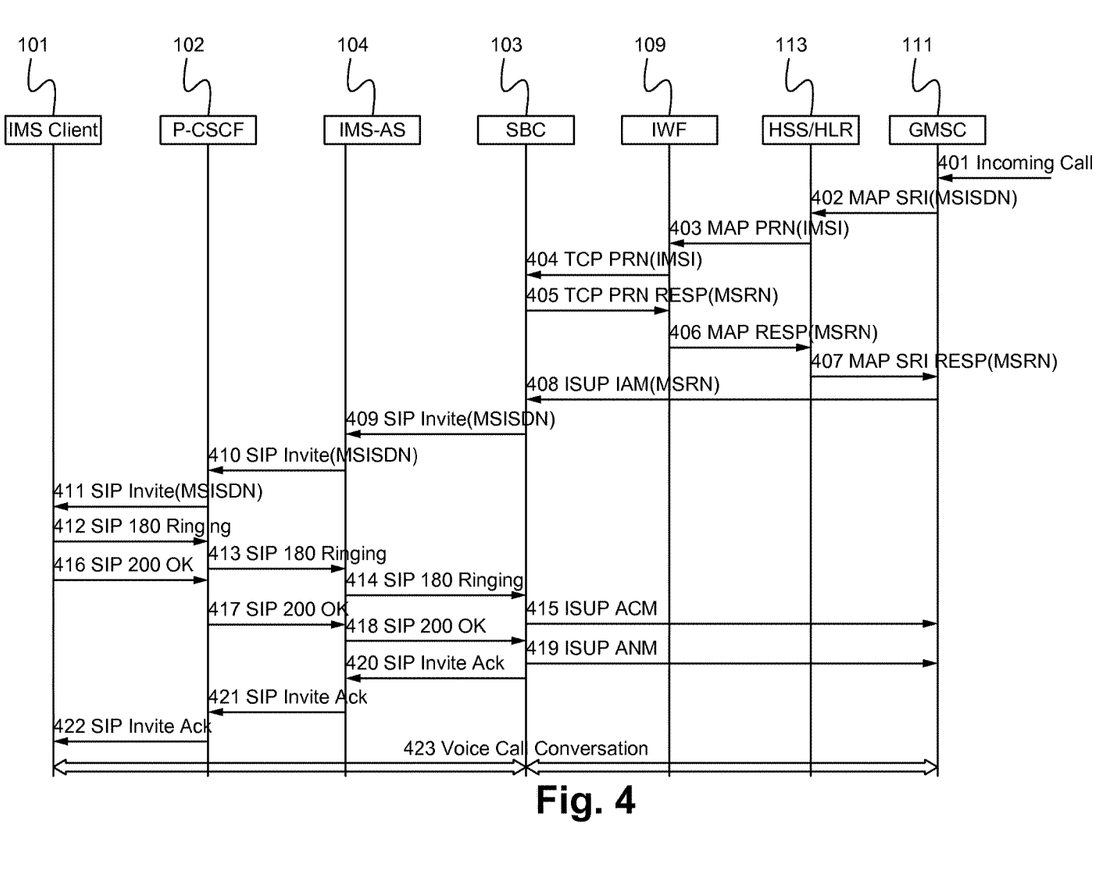
FIG. 4 is a detailed signaling call flow of the Voice Termination Call, where the IWF is used for mobile voice terminating call routing, and SBC is used as the Voice Switch Gateway to translate signaling and media codec, in accordance with one embodiment of the invention.

Referring now to FIGS. 1 and 4, which is an exemplary message flow for the Voice Termination Call Procedure in accordance with one embodiment of the invention, when an Incoming Call is made to the roamer that roams in the Greenfield LTE Operator network, the call first arrives 401 at the roamer's Home Operator 115 GMSC 111 from the Circuit Switch network.

To set up the call, the GMSC 111 initiates the Mobile Application Part Send Routing Information (MAP SRI(M-SISDN)) towards the HSS/HLR 113 (402) with Mobile Station Integrated Services Digital Network (MSISDN) as the destination parameter.

As the IWF 109 is recorded in the HSS/HLR 113 as the current VLR/MSC server for the specific MSISDN, the HSS/HLR 113 triggers the MAP Provide Roaming Number (MAP PRN(IMSI)) 403 to the IWF 109 asking for the MSRN for the voice call routing. In return, the IWF 109 queries the SBC 103 to provide the routing number via Transmission Control Protocol (TCP) or another proprietary interface by sending TCP PRN(IMSI) 404 to the SBC 103.

The SBC 103 allocates an internal number as the MSRN based on the numbering pool, saves the internal number in the Mobile Station Integrated Services Digital Network—Mobile Station Roaming Number (MSISDN-MSRN) mapping table, and then returns the MSRN in TCP PRN RESP (MSRN) 405 to the IWF 109.

The IWF 109 converts TCP PRN RESP(MSRN) 405 into MAP PRN RESP(MSRN) 406, which the IWF 109 then forwards to the HSS/HLR 113. As a result, the HSS/HLR 113 forwards MAP SRI RESP(MSRN) 407 to the GMSC 111. When the GMSC 111 receives the MSRN, it triggers ISDN User Part Initial Address Message ISUP IAM(MSRN) 408 towards the SBC 103 to set up the call.

The SBC 103 is able to be treated as a Voice Conversion and Switch Gateway System to external networks, and provides Network Address Translation (NAT) and firewall functions, protocol conversions, including the conversion among ISUP/TDM, SIP-I, SIP-T, IMS SIP signaling, etc. The SBC 103 converts the ISUP signaling into the SIP protocol, checks the internal MSRN-MSISDN mapping table, retrieves the current user's SIP registration address, converts the ISUP MSRN 408 into the SIP Invite(MSISDN) 409 and sends the SIP Invite(MSISDN) 409 to the IMS AS 104 with the MSIDDN as the called address. The IMS AS 104 then routes the SIP Invite (MSISDN) 410 towards the IMS Client 101, with the aid of P-CSCF 102 functioning as the SIP Proxy.

Upon receiving the SIP Invite(MSISDN) 411, the IMS Client 101 rings the user and generates SIP 180 Ringing 412 from to P-CSCF 102, which is transmitted as SIP 180 Ringing 413 from P-CSCF 102 to IMS AS 104, which is transmitted as SIP 180 Ringing 414 from IM AS 104 to SBC 103, which is further converted into ISDN User Part Initial Address Complete Message (ISUP ACM) 415 and sent to the GMSC 111.

Once the user answers the call, the IMS Client 101 generates SIP 200 OK 416 to P-CSCF 102, which is transmitted as SIP 200 OK 417 from P-CSCF 102 to IMS AS 104, which is transmitted as SIP 200 OK 418 from IMS-AS 104 to SBC 103, which is further converted into ISUP Answer Message (ISUP ANM) 419 and sent to the GMSC 111 to inform the GMSC 111 that the call is answered.

Accordingly, SIP Invite ACK 420 is generated by the SBC 103 when the ISUP ANM is triggered, and sent back to the IMS AS 104 (step 421) and further to IMS Client 101 (step 422) to finish the call setup procedure. After that, the voice channel is set up between IMS Client 101, the SBC 103, the GMSC 111 and the caller's device 100.

In sum, when the caller's (roaming) device 100 makes a voice call to others, the IMS Client 101 triggers the SIP Invite message towards the IMS-AS 104, and in turn the IMS-AS 104 routes the call to the destination based on a routing procedure, such as the standard SIP/IMS call setup procedure.

With the IWF introduced, the SMS can now be seamlessly supported by the Greenfield LTE operators by following the SMS over the SGs procedure defined in 3GPP TS 23.272 V12.2.0 (2014-03) Technical Specification; $3^{rd}$ Generation Partnership Project; Technical Specification Group Services and System Aspects; Circuit Switched (CS) fallback in Evolved Packet System (EPS); Stage 2 (Release 12), which is hereby incorporated by reference in its entirety. In this way, the roaming device in the LTE network can send and receive SMS messages in the same way as in a 2G/3G network.

Mobile SMS Terminating Call Routing

Figure 5:
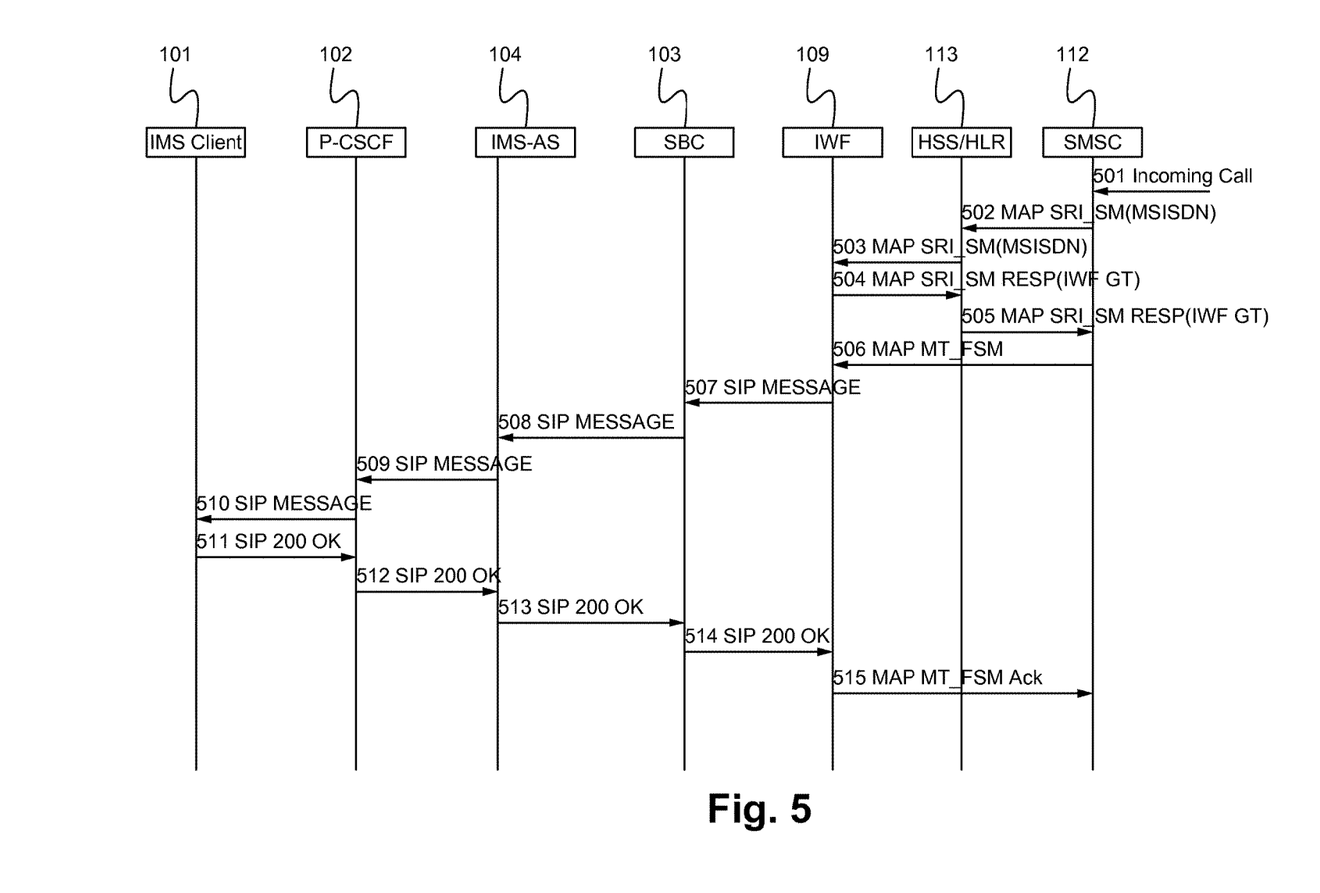
FIG. 5 is a detailed signaling call flow of the SMS Termination Call, where the IWF is used for SMS Terminating Call routing, in accordance with one embodiment of the invention.

Referring now to FIGS. 1 and 5, which is an exemplary message flow for the SMS Termination Call Procedure in accordance with one embodiment of the invention, when an Incoming SMS is made to the roamer that roams in the Greenfield LTE operator network, the call first arrives 501 at the roamer's Home Operator 115 SMSC 112.

To set up the call, the SMSC 112 initiates the MAP Send Routing Information-For-Short Message (MAP SRI_SM (MSISDN)) 502 towards the HSS/HLR 113 with MSISDN as the destination parameter.

Since the IWF 109 is recorded in the HSS/HLR 113 as the current VLR/MSC server for the specific MSISDN during the location update procedure, the HSS/HLR 113 forwards MAP SRI_SM(MSISDN) 503 to the IWF 109 asking for the MSC address for the SMS call routing.

The IWF 109 responds back with MAP SRI_SM RESP (IWF GT) 504, in which the IWF GT is carried as the current MSC address and forwarded to the HSS/HLR 113. As the response, the HSS/HLR 113 forwards MAP SRI_SM RESP (IWF GT) 505 to the SMSC 112.

When the SMSC 112 receives the MSC address, it triggers Mobile Application Part Forward Short Message (MAP MT_FSM) 506 towards the IWF 109 to transfer the SMS message.

The IWF 109 converts the MAP signaling into the SIP protocol, and sends SIP MESSAGE 507 with MSISDN to the SBC 103, which then forwards the message to the IMS AS 104 in message 508. The IMS AS 104 retrieves the current user's SIP registration address, and routes SIP MESSAGE 509 towards the IMS Client 101, with the aid of P-CSCF 102 functioning as the SIP Proxy.

Upon receiving SIP MESSAGE (510), the IMS Client 101 generates SIP 200 OK 511, which it forwards to P-CSCF 102, to the IMS AS 104, to the SBC 103, and to the IWF 109 via messages 512, 513, and 514, respectively. The SIP 200 OK message is then further converted into MAP MT_FSM ACK by the IWF 109 and sent to SMSC 112 via message 515.

It will be appreciated that the above embodiments are merely illustrative. For example, in other embodiments, the call flows can contain additional steps, some of the steps can be combined, and the steps can be performed in different orders, to name only a few modifications.

It will be readily apparent to one skilled in the art that modifications may be made to the embodiments without departing from the spirit and scope of the invention as defined by the appended claims.

What is claimed is:

1. An Interworking Function (IWF) system for converting between SGs protocol of visited network Mobile Management Entity (MME) and Mobile Application Part (MAP) protocol of a Home HLR/HSS to facilitate an International Mobile Subscriber Identity (IMSI) attach procedure, and enabling voice and SMS services for an end user device to roam into Greenfield LTE networks without legacy 2G/3G networks and without CSFB capabilities, the Interworking Function system comprising a processor and a memory containing computer-executable instructions that when executed by the processor perform a method comprising:

upon receiving SGs Update Location Request from an MME located in a visited Greenfield LTE network without legacy 2G/3G networks and without CSFB capabilities, converting the SGs Update Location Request into a MAP Update Location Request and sending the MAP Update Location Request to the Home HLR/HSS based on SS7 routing mechanism;

upon receiving the MAP Update Location Response from the Home HLR/HSS, converting the MAP Update Location Response into an SGs Update Location Response and relaying the SGs Update Location Response to the visited MME;

upon receiving voice call setup signaling from the Home HLR/HSS, interrogating a Voice Switch for Mobile Station Roaming Number (MSRN) and responding to the Home HLR/HSS;

transmitting MSRN to the user device, thereby enabling the user device to access voice call services in the Greenfield LTE network without legacy 2G/3G networks and without CSFB capabilities;

upon receiving SMS route query signaling from the Home HLR/HSS, responding with an Interworking Function Global Title address as the visited Mobile Switching Center (MSC) address; and upon receiving an SMS terminating message from a Short Message Service Center (SMSC), converting the SMS into SIP signaling and routing the SIP signaling to an IP Multimedia Subsystem (IMS) system for delivery to the end user device.

2. The system of claim 1, wherein the voice call setup signaling comprises a MAP Provide Roaming Number Request using International Mobile Subscriber Identity (IMSI) as a parameter.

3. The system of claim 1, wherein the Voice Switch for MSRN is interrogated using SIP protocol, SIP-I protocol, or a proprietary TCP/IP protocol.

4. The system of claim 3, wherein the voice call setup signaling further comprises the MAP Provide Roaming Number Response using MSRN as a parameter generated by the Interworking Function after interrogating the Voice Switch.

5. The system of claim 1, wherein the SMS route query signaling from Home HLR/HSS comprises MAP Send Routing Information for Short Message.

6. The system of claim 5, wherein the SMS route query signaling further comprises MAP Send Routing Information for Short Message Response with the Interworking Function global title address as the MSC address.

7. The system of claim 1, wherein the SMS termination signaling from SMSC comprises the MAP Mobile Terminating Forward Short Message Request message.

8. The system of claim 7, wherein the SMS termination signaling further comprises:

converting MAP protocol message into a corresponding SIP Message; and routing the SIP Message to the IMS system for delivery to the end user device.

9. The system of claim 8, wherein the SMS termination signaling further comprises responding to the SMSC with MAP Mobile Terminating Forward Short Message Response message with a delivery result based on a returned response from the IWIS System.

* * * * *